June 30, 1970 H. FUHRMANN 3,518,439
ABSORPTION TESTER HAVING BEAM SPLITTER AND WHEATSTONE BRIDGE
WITH POTENTIOMETER BALANCING
Filed March 6, 1968
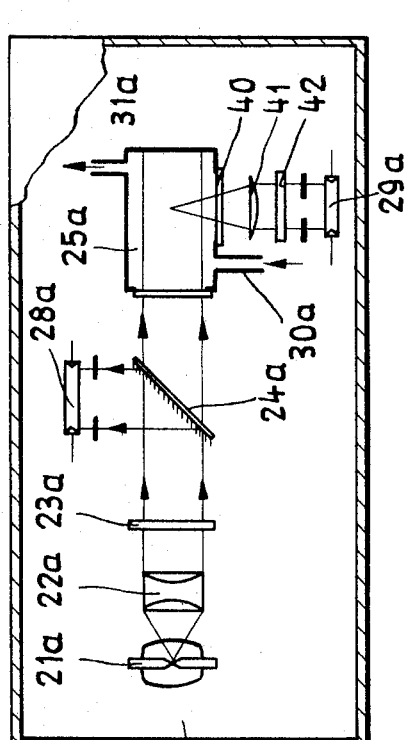
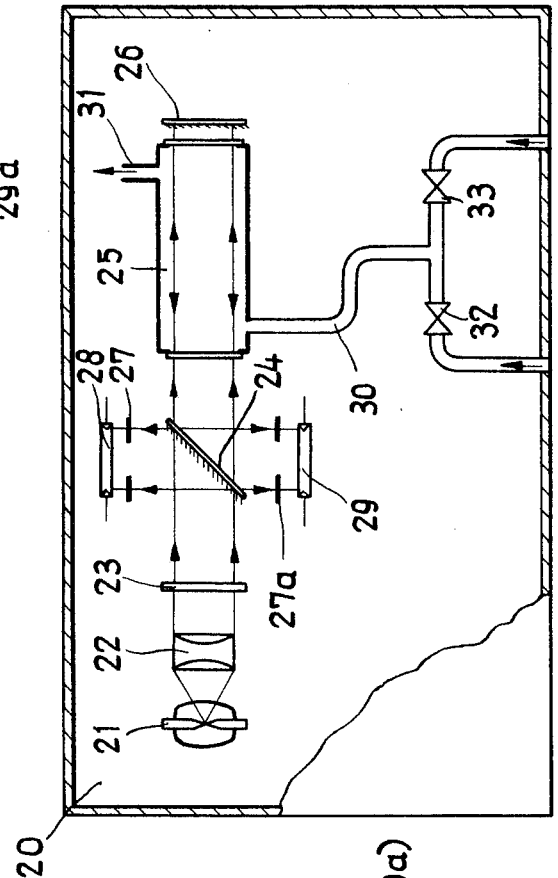
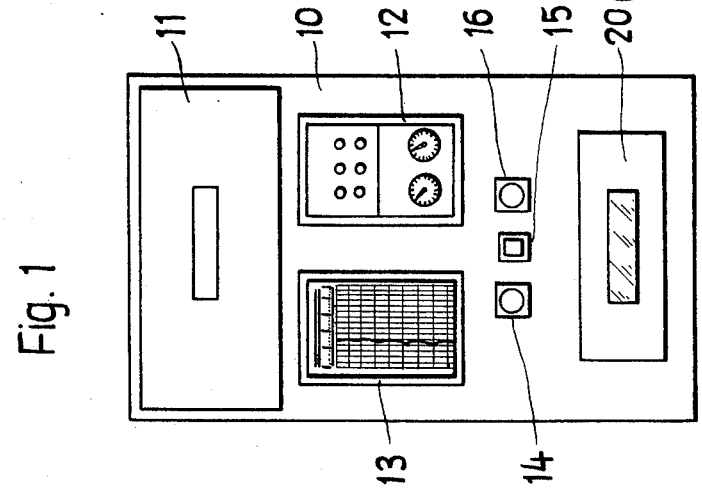
Inventor:
HANS FUHRMANN
By McGlew and Toren
Attorneys

United States Patent Office 3,518,439
Patented June 30, 1970

---

3,518,439
ABSORPTION TESTER HAVING BEAM SPLITTER AND WHEATSTONE BRIDGE WITH POTENTIOMETER BALANCING
Hans Fuhrmann, 2 Pannsweg, Hamburg-Langenhorn, Germany
Filed Mar. 6, 1968, Ser. No. 710,851
Claims priority, application Germany, Dec. 19, 1967, F 54,343
Int. Cl. G01n 21/02, 21/06
U.S. Cl. 250—218      6 Claims

ABSTRACT OF THE DISCLOSURE

Apparatus for the analytical testing of fluids by comparative photoelectric measurement of the transmittances of the fluids, or of the absorption of the fluids in different spectral regions, particularly in the ultra-violet regions, includes a light source for directing light through a cuvette traversed by the fluid and a pair of photoresistors which are connected in a Wheatstone bridge. A beam splitter is positioned in the path of the light rays between the light source and the cuvette, and reflects one partial beam laterally to a first photoresistor and passes another partial beam therethrough to the cuvette. This other partial beam is incident upon the second photoresistor. An adjustable diaphragm is positioned in advance of the first photoresistor and a fixed diaphragm is positioned in advance of the second photoresistor. For transmittance measurements, a fully reflecting mirror is positioned behind the cuvette and reflects the partial beam passing through the cuvette back to the beam splitter which reflects this partial beam laterally to the photoresistor. For absorbtion measurements, light entering the cuvette is reflected laterally through a window therein to the second photoresistor.

REFERENCE TO RELATED APPLICATION

The present invention is an improvement upon the analytical testing apparatus shown and described in Fuhrmann U.S. patent application Ser. No. 312,719 filed Sept. 30, 1963, and now U.S. Pat. No. 3,422,271, issued Jan. 14, 1969.

The invention relates particularly to apparatus for the automatic analytical testing of liquids or gases by comparative photoelectric measurements of the transmissivity of the solutions or by absorption of the solutions in the different spectral zones, particularly in the ultra-violet region, with or without a reference solution, by using an absorption cell and photo resistors of a photoelectric measuring system associated therewith.

Ultra-violet-, absorption-, Tyndall- and fluorescence-measurements have gained in importance for the monitoring of chemical processes. The sensitive spectral photometers, used in laboratories and operating on the dispersion principle, are unsuitable for the rough process operation which makes the following demands on the performance of measuring apparatus: a high degree of reliability, and a small maintenance effort, together with high sensitivity and stability over long periods of time.

Heretofore proposed measuring apparatus, which operate with arc light sources such as the mercury vapour and deuterium lamp, despite careful stabilisation, have a substantially poorer stability than metal filament lamps.

It is therefore an object of the invention to provide apparatus for the automatic analytical testing of liquids or gases, said apparatus satisfying the requirements made on the performance of analytical apparatus and being moreover economical.

The present invention provides apparatus for the automatic analytical testing of liquids and gases by comparative photoelectric measurement of the transmissivity of the solutions, or by absorption of the solutions in different spectral regions, in particular in the ultra-violet region, with or without reference solutions, comprising an absorption cell and photo resistors of a photoelectric system, the photo resistors being associated with the cell.

A total reflection mirror is positioned behind an absorption cell or cuvette which is disposed in the path of the light rays from a light source, and which is traversed by the fluid to be analytically tested. A beam splitter is positioned between the light source and the cuvette, and an interference filter is positioned between the light source and the beam splitter. The beam splitter reflects a partial light beam perpendicular to the light ray path to a first photoresistor, and passes a second partial beam therethrough to the cuvette. After the second partial beam passes through the cuvette, it is reflected by the total reflecting mirror back to the beam splitter, and the beam splitter reflects the second partial beam perpendicularly to the light ray path, with the second partial beam being incident upon the second photoresistor. The photoresistors are connected, in parallel, with fixed resistors, in a Wheatstone bridge which also includes a measuring potentiometer mechanically coupled to a tele-transmitter, and a null-balancing potentiometer. These potentiometers are coupled to controlled servo-motors for balancing the bridge.

The light source is either a mercury vapour lamp or a deuterium lamp, while a fixed diaphragm may be disposed upstream of one of photoresistors and an adjustable iris diaphragm may be disposed upstream of the other photo resistor.

According to a further feature of the invention, the bottom of the absorption cell is provided with a window for the measurement of dispersion and fluorescence, the photo resistor with a secondary filter disposed upstream thereof, specifically provided for the modified analytical method, being positioned in the region of this window.

Embodiments of the invention will now be described, by way of example, with reference to the accompanying drawing, in which:

FIG. 1 is a front view of apparatus according to the present invention, disposed in a housing;

FIG. 2 is a diagrammatic view of apparatus for performing absorption measurements; and FIG. 3 is a diagrammatic view of a further embodiment of the apparatus, for performing fluorescence measurements.

The apparatus according to the invention, for absorption measurements, or for fluorescence measurements is provided according to FIG. 1 in a housing or in a flush-mounting panel 10. The numeral 11 refers to a program transmitter. The numerals 12 and 13 refer to a compensator and a recorder. The numerals 14, 15, 16 refer to a selector switch, an operating lamp and an operating switch, respectively. The actual analyser 20 is constructed as a flush-mounting module and is accommodated in the lower part of the apparatus housing 10.

According to FIG. 2, the analyser 20 for the absorption measurement comprises a housing which has disposed in it a mercury vapour lamp or a deuterium lamp 21 to function as light source. The excited radiation of the aforementioned light source 21 is concentrated by a condenser 22, is orientated in parallel and is subsequently filtered in a monochromatic filter (interference filter) 23 and transmitted via a beam splitter 24 through an absorption cell 25 to the totally reflecting mirror 26 disposed behind the absorption cell or cuvette 25. The light reflected by the mirror 26 once again passes through the absorption cell 25 and strikes the beam splitter 24.

The beam splitter 24 is so constructed and so disposed in the optical path of the light beams emitted by the light source 21, that on initially striking the beam splitter 24, half of the light is upwardly or laterally deflected at right angles to the incident light to strike a photo resistor 28, having an iris diaphragm 27 disposed upstream thereof adapted to be adjustable and which serves for the course regulation of the null-balancing point. The beams transmitted through the beam splitter 24 are reflected by the mirror 26 and on striking the beam splitter 24, are deflected downwardly or laterally at right angles to the incident direction to a second photo resistor 29. A fixed diaphragm 27a is disposed upstream in advance of the photo resistor 29.

The photo resistor 29 may be disposed directly behind the absorption cell 25, in place of the mirror 26 for the measurement of high concentrations with small film thicknesses of only a few millimeters.

The absorption cell 25 is constructed in a known manner and is provided with a fluid inlet 30 and a fluid outlet 31.

For the electrical detection of the reference values and measured values, the photo resistors 28, 29 are connected in parallel to the fixed resistors in a Wheatstone bridge in accordance with the circuit disclosed in my U.S. patent application Ser. No. 312,719. filed Sept. 30, 1963, now U.S. Pat. 3,422,271, issued Jan. 14, 1969, to which reference is hereby made. As particularly disclosed in FIG. 2 of U.S. Pat. 3,422,271, this circuit includes a Wheatstone bridge in which photoresistors 34 and 35, corresponding to photoresistors 28 and 29, are connected in parallel with fixed resistances 40 and 41. The bridge includes a measuring potentiometer 48, mechanically coupled to a teletransmitter 53, and a null-balancing potentiometer 49. Respective controlled servo-motors 50 and 51 are connected to the potentiometers 48 and 49 for adjusting the balance of the bridge, as described in U.S. Pat. 3,422,271.

The method of operation of the apparatus according to the invention with automatic compensation is as follows: the media to be measured are supplied to the absorption cell 25 via a solenoid valve 33 which is one of two solenoid valves 32, 33 disposed in the inlet 30. A program sequence switching mechanism of known construction is adapted to operate the solenoid valves 32 and 33 at adjustable intervals of time, so that either the specimen to be investigated or the reference medium, a solution corresponding to the zero balance point, or an inert gas is conveyed through the absorption cell 25 by means of pumps which are not shown in the drawing.

A compensating relay provided in the circuit alternately switches the amplifier to "measuring" and "compensation." The two ultra-violet sensitive photo resistors 28, 29, employed for measuring the light intensity, are connected in the Wheatstone bridge circuit which is supplied with an AC voltage. The two potentiometers, driven by servomotors, namely, the null-balancing potentiometer and the measuring potentiometer, which latter is mechanically coupled to the transmitter, balance the bridge in the positions "measuring" and "compensating." A transistor amplifier drives the servomotors which are alternatively switched on in the correct phase to obtain zero balance. The measured value is continuously indicated; it is retained during compensation and automatically corrects itself on completion of the bridge balancing procedure.

The measured value and the correction value are separately indicated on a scale of 355°. The correction value potentiometer is provided with two limiting contacts for operating a warning lamp in the event of irregularities in the amplifier and due to contamination of the absorption cell, that is to say, when the correction range is exceeded. The measured value scale is provided with an adjustable maximum contact. The null-balancing point correction can be adjusted over the range between three minutes and one second and is adapted to repeat itself at regular intervals.

A plurality of gaseous and liquid components have specific absorption properties in narrow bands of the ultraviolet spectral region, so that apparatus according to the invention may be employed for a wide range of applications. For example, it is possible to apply analytical measurement to vapors and liquids such as mercury, acetone, benzol, phenol, butadine, nickelcarbonyl and the like in addition to gases such as $NO_2$, $Cl_2$, $ClO_2$, $O_3$, phosgene and $SO_2$. Absorption measurements may be performed in the simplest possible manner. Highly accurate measured results may be obtained owing to the high sensitivity of the apparatus and because of the lack of sensitivity to temperature fluctuations. In addition, the need for maintenance is slight. The use of automatic null-balancing point compensation in apparatus for absorption measurements offers the facility within each measuring cycle for automatically compensating the effects of temperature, ageing of the photo resistors and changes of the light source so that highly accurate measured results can be obtained. A further advantage is due to the fact that the light rays from the light source extend to only one side, while using only one spectral filter, and owing to the fact that a beam splitter is provided for splitting the measuring and reference beam. Accordingly, the apparatus is simply constructed, has no trouble-prone components and occupies only a small amount of space.

According to a further feature of the invention, the apparatus for the automatic analytical testing of liquids or gases is so constructed as to enable dispersion-light and fluorescence measurements to be performed. It is in particular fluorometry which enables sensitive quantitative analyses to be performed for many substances. The apparatus 20a, for performing dispersion-light and fluorescence measurements according to FIG. 3, has almost the same construction as the apparatus according to FIG. 2, so that corresponding parts of FIG. 3 are provided with the same reference symbols to which the letter a has been added. The excited radiation of the mercury vapour lamp 21a is ducted through the condenser 22a via the monochromator 23a, representing an interference filter with the desired transmissivity, and via the beam splitter 24a into the absorption cell 25a. The inlet and outlet of the absorption cell 25a are referenced with 30a, 31a. A window 40 is provided at the bottom of the absorption cell 25a. The fluorescent light is directed perpendicularly to the incident direction through the aforementioned window 40, via a lens 41, to a photo resistor 29a with a fixed diaphragm disposed in advance thereof. A secondary filter 42, which is specific for the modified analytical method, is disposed between the lens 41 and the photo resistor 29a, or the diaphragm disposed in advance thereof. The photo resistor 28a is disposed in the region of the beam splitter 24a in the same manner as in the apparatus illustrated in FIG. 2. The photo resistors 28a, 29a are connected, in the same manner as the photo resistors 28, 29, in a Wheatstone bridge which is supplied with an AC voltage, as shown in FIG. 2 of U.S. Pat. 3,422,271. The null-balancing point compensation is performed in accordance with the bridge balancing method heretofore described. The null-balancing point is automatically compensated with a dummy fluorescence reference solution, in a manner similar to that adopted for absorption measurement. The secondary filter 42 is omitted if the apparatus is to be employed for performing turbidity measurements.

What I claim is:

1. In apparatus for the analytical testing of fluids, such as liquids and gases, by comparative photoelectric measurement of the transmittances of the fluids, or of the absorption of the fluids in different spectral regions, particularly in the ultra-violet regions, and of the type including a light source, at least one measuring cuvette traversed by a fluid and a pair of photoresistors connected in parallel to fixed resistors in a Wheatstone bridge having also connected therein a measuring potentiometer, mechanically coupled to a tele-transmitter, and a null-balancing potentiometer with the potentiometers being coupled to controlled servo-motors for balancing the bridge: the improvement comprising, in combination a beam splitter positioned in the path of light rays directed from said light source through a cuvette; an interference filter positioned in the light ray path between said light source and said beam splitters; said beam splitter dividing the light ray from said light source into a first partial beam, reflected laterally of said light ray path to a first photoresistor, and a second partial beam, passing through said beam splitter and said cuvette; the second photoresistor having said second partial beam incident thereupon after passing through said cuvette; an adjustable diaphragm positioned between said beam splitter and said first photoresistors; and a fixed diaphragm positioned in the path of light rays incident upon the second photoresistor after passing through said cuvette.

2. In apparatus for the analytical testing of fluids, the improvement claimed in claim 1, in which said light source is a mercury vapor lamp.

3. In apparatus for the analytical testing of fluids, the improvement claimed in claim 1, in which said light source is a deuterium lamp.

4. In apparatus for the analytical testing of fluids, the improvement claimed in claim 1, including a fully reflecting mirror positioned behind said cuvette and reflecting said second partial beam back through said cuvette to said beam splitter; said beam splitter deflecting the thus reflected second partial beam laterally of the light ray path and to the second photoresistor.

5. In apparatus for the analytical testing of fluids, the improvement claimed in claim 5, in which the second photoresistor is positioned directly behind said cuvette.

6. In apparatus for the analytical testing of fluids, the improvement claimed in claim 1, in which said cuvette has a window positioned in a lateral wall thereof, whereby light of said second partial beam entering said cuvette will pass through said window; the second photoresistor being positioned in the path of light passing outwardly through said window.

References Cited
UNITED STATES PATENTS

| | | | |
|---|---|---|---|
| 2,964,640 | 12/1960 | Wippler | 356—208 |
| 3,013,467 | 12/1961 | Minsky | 356—201 |
| 3,272,065 | 9/1966 | Ito et al. | 250—210 |
| 3,368,637 | 2/1968 | Green et al. | 250—210 |

RALPH G. NILSON, Primary Examiner

M. ABRAMSON, Assistant Examiner

U.S. Cl. X.R.
356—208